June 27, 1944.   R. L. TRIPLETT   2,352,576
BATTERY CLIP
Filed Dec. 31, 1940

INVENTOR
RAY L. TRIPLETT
ATTORNEYS

Patented June 27, 1944

2,352,576

UNITED STATES PATENT OFFICE 2,352,576

BATTERY CLIP

Ray L. Triplett, Bluffton, Ohio

Application December 31, 1940, Serial No. 372,464

5 Claims. (Cl. 136—173)

The present invention relates to electrical measuring devices, and more especially to those instruments which contain a battery for measurement or calibration purposes.

The invention has particular application to those electrical devices in which it is desired to flexibly but securely mount the battery within the container of the device. Various ways have been proposed for mounting a battery within boxlike instruments, and in practically all cases ledges or other anchoring platforms are provided within the box, and a cradle mounted on these ledges for supporting the battery. Difficulty has been encountered in removing the battery from its support member, and in the case of measuring instruments which require a battery source of electromotive force, as for example when employing balanced bridge circuits, it has been quite a problem quickly to replace worn out batteries. Another problem which this invention is designed to avoid is the common practice of soldering battery terminals.

The primary object of the present invention is to provide an improved structure by which a battery, or other electrical element, may be detachably supported within the container of an instrument.

Another object is to provide an improved structure by which a battery may be resiliently supported within an instrument box and to hold the battery in place when removed from the box, and to make more firm connections when placed in the box.

The final object is to provide an improved support for the battery which can be detachably mounted within an instrument casing and requires no ledges or other form of support within the casing.

The invention will be better understood when the specification is perused in connection with the accompanying drawing.

Figure 1:
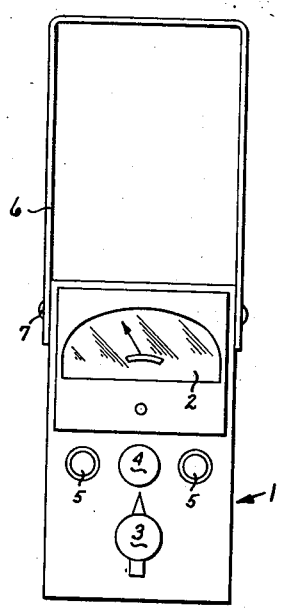
Figure 1 is a plan view of a typical form of electrical instrument in which the improved battery support finds application. This figure also shows a handle for carrying the instrument.

Referring to Figure 1, the numeral 1 designates a casing containing an electrical instrument casing of any suitable and well known type, and preferably having a rectangular form. The instrument may be a volt-ohm-milliammeter for measuring the electrical constants of resistors or the voltage across a pair of lines, or the current flowing through the lines or the resistance of the lines. The casing 1 is usually fabricated of moldable insulation material, and the upper portion contains an electrical measuring instrument which might be an ammeter or a voltmeter 2, the circuits to which are controlled by a rotary switch 3 and a variable potentiometer indicated by a knob 4. On each side of the knob 4 there may be provided jacks 5, to which incoming or outgoing lines may be detachably connected. A handle 6, constituted of a U-shaped metal strap, may be provided, the strap being riveted at 7 to the casing of the instrument.

Figure 2:
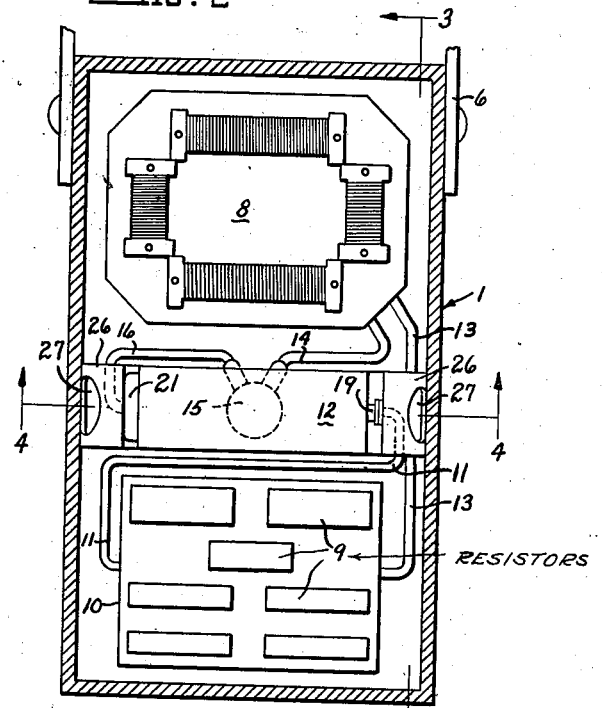
Figure 2 is an enlarged view of the instrument shown in Figure 1, but with the top cover removed to expose the interior parts.
Figure 3:
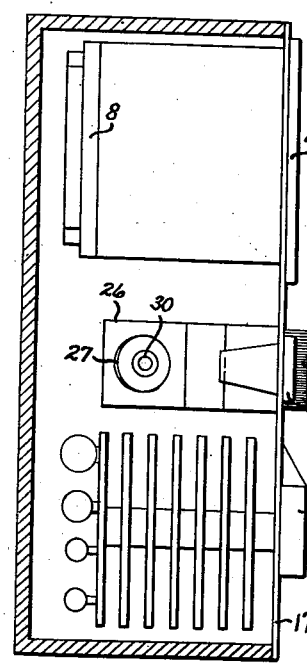
Figure 3 is a sectional view of the instrument box shown in Figure 1, and looking in the direction of the arrowed line 3—3.

The contents of the instrument casing 1 are diagrammatically indicated in Figure 2, and will be described only to the extent of indicating the structural relationship between the various elements and the battery and its improved support. A bridge circuit, or any other type of electrical network is indicated by the reference numeral 8, this bridge circuit including four or more resistors arranged generally in a rectangular formation. At the other end of the casing 1 there are a number of electrical elements, which might be resistors indicated at 9, secured to a base 10 and to which connections are made from the exterior of the casing by means of the multi-blade rotary switch 3. A conductor 11 is taken from one side of the resistance bank 9 to the right-hand end of the battery indicated at 12, which may be of the flash light type. The opposite conductor 13 from the resistance bank may be taken to the bridge circuit 8. The return circuit from the bridge, constituted of the wire 14, passes through a potentiometer or rheostat 15, and thence to the left-hand side of the battery 12 through the conductor 16.

In the manufacture of the instrument which has been generally described up to this point, the resistors which form the bridge circuit 8 and the resistance bank 9 are usually permanently secured to the bottom plate of the container or box 1, but the remaining elements, including the potentiometer 15, the battery 12 and the jacks 5, are carried on the top cover or panel 17 of the casing. This type of panel is usually secured to the sides of the casing by screws at each corner. In case the battery has only a single point of support, i. e. to the top panel of the casing, there is a tendency for the battery to move with respect to the casing when in position, and particularly as the instrument is being carried around.

In accordance with the present invention, there is provided an improved support for the battery which gives considerable flexibility of position between the battery and the casing and yet precludes any harmful movement of the battery within the casing. A battery of the flash light type is usually provided with a cardboard exterior, indicated at 18, and is provided at one end with a relatively small centrally positioned metal terminal 19. The other end of the battery is terminated by a metal portion 20, usually of humped or curvilinear form, and serving as the second terminal of the battery. A hollow cup-shaped metal element 21 is caused to bear against the metal portion 20 and thus to make contact therewith.

In order resiliently to mount the battery within the casing there is provided a rectangularly shaped strap of spring-like metal having two parallel portions 22, 23 which straddle the ends of the battery as indicated, and terminating in a contracted rectangular portion formed by the sides 24, the end portion 25 of which abuts the under side of the under surface of the panel 17. The upper or outer ends of the strap portions 22, 23 are provided with reversely directed curvilinear portions 26 having relatively large openings 27. These openings are preferably directly in line with the central axis of the battery, for reasons which will appear presently. The flat portion 22 of the metal strap has an opening in line with a similar opening in the cup-shaped member 21 to receive either a rivet or a globule of solder 28, by which the conductor 16 is electrically connected to the member 21 and therefore to one terminal of the battery. The solder 28 may be applied through the left-hand opening 27 in the strap. The small central terminal 19 carries a metal collar 29 which fits around a sleeve 30 of insulating material and having flared ends, as indicated at 31. This sleeve is contained within an opening in the flat strap portion 23 but insulated from the strap by means of a rubber bushing 32. Thus the terminal 19 is insulated from the strap.

Figure 4:
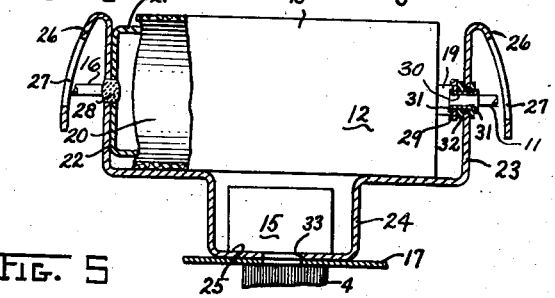
Figure 4 is a cross sectional view taken on the line 4—4 in Figure 2, but with the sides of the box removed.
Figure 5:
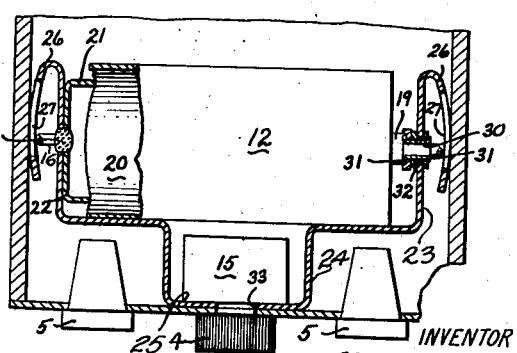
Figure 5 is a view similar to Figure 4 except that the sides of the instrument box have been additionally shown in order to depict the relationship of the parts of the improved battery support and the instrument casing.

It is apparent that in order to remove the battery 12 from the spring clip construction it is only necessary to spring the flat portion 22 of the strap away from the left-hand end of the battery, thus withdrawing the cup-shaped element 22 from the metal surface 20 and permitting the battery to be readily removed from the strap. The lowermost portion 25 of the strap, as shown in Figure 4, is provided with an opening 33 which receives the shaft connecting the movable element of the potentiometer 15 with the external knob 4. Consequently, when the screws (not shown) which hold the panel 17 to the casing 1 have been removed the panel, also the potentiometer 15, the battery 12 and its spring clip support member can be readily removed from the casing. If desired, the battery may then be replaced by another battery simply by springing open the strap member, as explained above.

The overall length as measured from the tip of one curved portion 26 along the length of the battery to the tip of the other curved portion 26 is somewhat greater than the width of the casing, so that when it is desired to position the panel 17 on the casing the spring members 26 are caused to contract over their overall length and to bear tightly against the sides of the box. Thus the spring effect exerted at the elements 26 serves to cushion the battery against the side walls, and hence the battery is securely but flexibly supported within the container or box. The clamping effects exerted by the sides of the box against the spring elements 26 serve also to force the cup-shaped member 21 against the metal face 20 so as to insure a good electrical contact. The wire 16 is connected to the member 21 by being soldered, or in any other manner secured to the solder button 28. The soldering operation may be conveniently performed through the adjacent opening 27 in the curved element 26. The conductor 11 is electrically connected to the contact member 19 by being soldered or otherwise secured to the sleeve 30. It has been explained that the metal strap portion 23 is insulated from the contact 18 and the sleeve 30 so there is no possibility of the flexible strap short-circuiting the battery. The soldering operation at the sleeve may be performed through the adjacent opening 27 in the curved member 26.

From the foregoing it is evident that I have disclosed a structure by which a battery may be flexibly supported within the casing of an instrument without the necessity of providing ledges, cleats or other support members secured to the sides of the casing. The battery is held between the sides of the casing solely by frictional effects, and the arrangement is such that the battery may be readily removed from its spring holder and a new battery placed in position by simply removing the panel and forcing the clip element open. The central contact member 19 is readily detachable from the metal collar 29 at one end and from the cup-shaped element 21 at the other end, so that the connections to the wires 11 and 16 are left intact ready for the next battery. There is therefore no soldering problem.

While I have described my invention in connection with the insertion of a battery into an electrical measuring instrument, it will be understood that the use of the spring clip arrangement is not limited to electrical instruments but may be applied to any electrical apparatus in which it is desired flexibly to support a battery within a container, and without the necessity for support ledges, cleats, etc. The fact that no ledges or cleats are necessary is of particular advantage in case the box is made of moldable sheet material, because the entire interior of the box may constitute planar surfaces the continuity of which is not broken by projections of any character.

While I have described the feature of having the ends of the spring member 26 bear directly against the sides of the box 1, it will be understood that if desired the spring member may contact any other clamping surfaces within the box, such as brackets or other restraining walls. In such case the overall distance between the ends of the spring member 26 is normally greater than the distance between the clamping surfaces within the box, regardless of the position and character of those surfaces.

It will be understood that I desire to comprehend within my invention such modifications as come within the scope of the claims and the invention.

Having thus fully described my invention, what I claim as new and desire to secure by Letters Patent, is:

1. As an article of manufacture, a battery clip formed of a strap of resilient material and having a U-shaped configuration, the ends of the strap being provided with reversely bent curvilinear portions which are adapted to bear against the sides of a box in which the battery is inserted, a cup-shaped element attached to an arm of the U-shaped strap which is adapted to support one end contact of the battery, said element bearing directly against said contact and serving as a terminal for a conductor which extends away from the strap, said reversely bent curvilinear portion which is attached to the said cup-shaped element serving to resiliently bear against the battery box and to resiliently force the cup-shaped element into contact with said battery end contact, where the battery is supported between the arms of the U-shaped strap.

2. As an article of manufacture, a battery clip formed of a strap of resilient material and having a U-shaped configuration, the ends of the strap being provided with reversely bent curvilinear portions which are adapted to bear against the sides of a box in which the battery is inserted, one of the sides of the U-shaped strap being secured to a cup-shaped element which is adapted to support an end contact of the battery, and an opening provided in each of said curvilinear portions in order to expose the position at which the cup-shaped element is secured to the strap member and the position of the contact, where the battery is supported between the arms of the U-shaped strap.

3. As an article of manufacture for insertion in a battery box a battery clip comprising a strap of resilient material and having a U-shaped configuration, the ends of the strap being provided with reversely bent curvilinear portions which are adapted to resiliently bear against the sides of the box in which the battery is inserted, one of said reversely bent portions having a member attached thereto and adapted to bear against one of the end contacts of the battery, whereby when said clip and battery are inserted within a battery box said reversely bent curvilinear portions will resiliently bear against said battery box and said one reversely bent portion will resiliently force said member against the end terminal of said battery, where the battery is supported between the arms of the U-shaped strap.

4. As an article of manufacture for insertion in a battery box a battery clip comprising a strap of resilient material and having a U-shaped configuration, the ends of the strap being provided with reversely bent curvilinear portions which are adapted to resiliently bear against the sides of the box in which the battery is inserted, one of said reversely bent portions having a member attached thereto and adapted to bear against one of the end contacts of the battery, whereby when said clip and battery are inserted within a battery box said reversely bent curvilinear portions will resiliently bear against said battery box and said one reversely bent portion will resiliently force said member against the end terminal of said battery, said other reversely bent portion having an insulating member in order to prevent short-circuiting said battery with said U-shaped member, where the battery is supported between the arms of the U-shaped strap.

5. As an article of manufacture for insertion in a battery box a battery clip adapted to receive a battery between the ends of said clip, said clip having reversely bent ends of flexible material which are curved to resiliently bear against the sides of the battery box, said clip being adapted to span the battery about the ends thereof, one of said curved ends having means to bear against and hold said battery in place within said clip when said battery has been inserted in a battery box to thereby force said means against said battery end, said means being electrically connected to said clip, the portion of the opposite end of the clip receiving battery being insulated from the rest of the clip.

RAY L. TRIPLETT.